United States Patent
Arnold et al.

(10) Patent No.: US 10,582,002 B2
(45) Date of Patent: Mar. 3, 2020

(54) CACHE PROXY FOR A NETWORK MANAGEMENT INFORMATION BASE

(71) Applicant: ARRIS Enterprises LLC, Suwanee, GA (US)

(72) Inventors: Erich C. Arnold, Cape Coral, FL (US); Venugopal Vasudevan, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 116 days.

(21) Appl. No.: 15/374,366

(22) Filed: Dec. 9, 2016

(65) Prior Publication Data

US 2018/0167485 A1  Jun. 14, 2018

(51) Int. Cl.
*H04L 29/08* (2006.01)
*H04L 12/24* (2006.01)

(52) U.S. Cl.
CPC ...... *H04L 67/2852* (2013.01); *H04L 41/0246* (2013.01)

(58) Field of Classification Search
CPC .................. H04L 67/2852; H04L 67/2833
See application file for complete search history.

(56) References Cited

U.S. PATENT DOCUMENTS

| | | | | |
|---|---|---|---|---|
| 6,128,656 A * | 10/2000 | Matchefts | ........... | H04L 41/0816 709/223 |
| 6,148,337 A * | 11/2000 | Estberg | .................. | H04L 41/046 709/223 |
| 6,426,947 B1 * | 7/2002 | Banker | ............... | H04L 41/0213 370/254 |
| 6,466,980 B1 * | 10/2002 | Lumelsky | ............. | G06F 9/5055 707/999.2 |
| 6,564,341 B1 * | 5/2003 | Sundaram | ........... | H04L 41/0213 370/241 |
| 6,697,845 B1 * | 2/2004 | Andrews | ............. | H04L 41/0213 709/208 |

(Continued)

FOREIGN PATENT DOCUMENTS

WO    2013155390 A1    10/2013

OTHER PUBLICATIONS

Elie, "SNMP proxy forwarder", SourceForge.net, Sep. 28, 2015, 3 pages.

*Primary Examiner* — Blake J Rubin
(74) *Attorney, Agent, or Firm* — Chernoff, Vilhauer, McClung & Stenzel, LLP

(57) ABSTRACT

In one embodiment, a proxy forwards a first request from a manager for an object in a management information base to an agent in a network device, the object describing a characteristic of the network device. The proxy receives the object from the agent and categorizes the object in a category of a plurality of categories based on a characteristic of the object. At least two categories in the plurality of categories are associated with different time-to-live values. The proxy caches the object from the agent with a time-to-live value in a cache, the time-to-live value associated with the category. Then, the proxy returns the object to the manager. The proxy responds to a second request for the object using the cached object while the time-to-live value is valid without having to forward the second request to the agent.

20 Claims, 7 Drawing Sheets

(56) References Cited

U.S. PATENT DOCUMENTS

| | | | |
|---|---|---|---|
| 6,996,616 B1* | 2/2006 | Leighton | H04L 29/12009 707/999.01 |
| 7,328,260 B1* | 2/2008 | Muthiyan | H04L 41/0681 709/220 |
| 7,430,594 B2* | 9/2008 | Krupczak | H04L 41/0213 709/223 |
| 7,478,151 B1* | 1/2009 | Maiocco | H04L 43/08 709/223 |
| 7,555,743 B2* | 6/2009 | Sridhar | G06F 8/20 717/106 |
| 8,285,808 B1* | 10/2012 | Joel | G06F 17/30905 709/213 |
| 8,380,828 B1* | 2/2013 | Schlichter | H04L 63/0227 709/221 |
| 8,498,612 B2* | 7/2013 | Chou | G06Q 50/32 455/406 |
| 8,645,519 B2* | 2/2014 | He | H04L 41/0213 370/328 |
| 8,898,268 B2* | 11/2014 | Shelby | H04L 41/0253 709/223 |
| 10,116,544 B2* | 10/2018 | Bonica | H04L 43/065 |
| 2002/0112076 A1* | 8/2002 | Rueda | H04L 12/14 709/245 |
| 2002/0147764 A1* | 10/2002 | Krupczak | H04L 41/0213 709/202 |
| 2003/0055892 A1* | 3/2003 | Huitema | H04L 29/06 709/204 |
| 2005/0050013 A1* | 3/2005 | Ferlitsch | G06F 3/1204 |
| 2005/0050311 A1* | 3/2005 | Joseph | G06F 16/40 713/1 |
| 2006/0047801 A1* | 3/2006 | Haag | H04L 41/0213 709/223 |
| 2006/0101026 A1* | 5/2006 | Fukushima | H04L 29/06 |
| 2007/0115850 A1* | 5/2007 | Tsuchiya | H04L 43/022 370/252 |
| 2007/0250625 A1* | 10/2007 | Titus | H04L 41/0213 709/224 |
| 2007/0274213 A1* | 11/2007 | Stephan | H04L 41/00 370/235 |
| 2008/0201468 A1* | 8/2008 | Titus | H04L 29/06 709/224 |
| 2008/0281963 A1* | 11/2008 | Fletcher | H04L 41/046 709/224 |
| 2009/0003225 A1* | 1/2009 | Klassen | H04L 43/50 370/250 |
| 2009/0116404 A1* | 5/2009 | Mahop | H04L 41/0213 370/254 |
| 2010/0332680 A1* | 12/2010 | Anderson | H04L 61/1511 709/245 |
| 2011/0271007 A1* | 11/2011 | Wang | H04L 45/306 709/238 |
| 2012/0096137 A1* | 4/2012 | He | H04L 41/0213 709/223 |
| 2012/0197962 A1* | 8/2012 | Maenpaa | H04L 67/104 709/201 |
| 2013/0275543 A1 | 10/2013 | Jain | |
| 2014/0173034 A1* | 6/2014 | Liu | H04L 67/1063 709/217 |
| 2014/0270125 A1* | 9/2014 | Khan | H04M 3/38 379/189 |
| 2016/0092537 A1* | 3/2016 | Vieira | G06F 17/30575 707/634 |
| 2017/0052978 A1* | 2/2017 | Gupta | G06F 17/30179 |
| 2017/0126626 A1* | 5/2017 | Datta | H04L 61/00 |
| 2017/0195426 A1* | 7/2017 | Tanaka | G06F 21/335 |

* cited by examiner

CACHE PROXY FOR A NETWORK MANAGEMENT INFORMATION BASE

BACKGROUND

A management information base (MIB) is a database that is used to manage entities in a network. A protocol, such as simple network management protocol (SNMP) is used to request submit changes to objects from the management information base.

When an SNMP manager wants to learn about objects in the management information base for a network device, the network manager may send SNMP requests to the network device. The network management system may include multiple SNMP managers that send a large number of SNMP queries to the network device to obtain timely statistics and to configure the network device. However, the network devices may have minimal resources that cannot handle the query load from multiple network management systems.

SUMMARY

In one embodiment, a proxy forwards a first request from a manager for an object in a management information base to an agent in a network device, the object describing a characteristic of the network device. The proxy receives the object from the agent and categorizes the object in a category of a plurality of categories based on a characteristic of the object. Different categories in the plurality of categories are associated with different time-to-live values. The proxy caches the object from the agent with a time-to-live value in a cache, the time-to-live value associated with the category. Then, the proxy returns the object to the manager. The proxy responds to a second request for the object using the cached object while the time-to-live value is valid without having to forward the second request to the agent.

In one embodiment, a non-transitory computer-readable storage medium contains instructions that, when executed, control a computer system to be configured for: forwarding, by a proxy, a first request from a manager for an object in a management information base to an agent in a network device, the object describing a characteristic of the network device; receiving, by the proxy, the object from the agent; categorizing, by the proxy, the object in a category of a plurality of categories based on a characteristic of the object, wherein different categories in the plurality of categories are associated different time-to-live values; caching, by the proxy, the object from the agent with a time-to-live value in a cache, the time-to-live value associated with the category; returning, by the proxy, the object to the manager; and responding, by the proxy, to a second request for the object using the cached object while the time-to-live value is valid without having to forward the second request to the agent.

In one embodiment, a method includes: receiving, by a proxy at a computing device, a first request from a manager for an object in a management information base at a network device, the object describing a characteristic of the network device; determining, by the proxy at the computing device, if a cache includes the object; when the cache includes the object, determining, by the proxy at the computing device, if a time-to-live value is valid for the object; when the time-to-live value is valid, by the proxy at the computing device, sending the object from the cache to the manager without sending the request to an agent at the network device; when the time-to-live value is not valid, determining, by the proxy at the computing device, if the first request should be converted into a second request, wherein the first request is converted when the first request is a request for retrieving a next object in a hierarchy or a plurality of objects in the hierarchy; and when the first request should be converted into a second request, converting, by the proxy at the computing device, the first request to the second request for the object and sending the second request to the agent.

The following detailed description and accompanying drawings provide a better understanding of the nature and advantages of particular embodiments.

DETAILED DESCRIPTION

Described herein are techniques for a caching proxy to respond to queries to a network device. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a caching proxy to interface between a network management systems and a network device. The caching proxy may intercept queries from the network management system. The caching proxy may then determine if an object that satisfies the request is found in the cache. If a valid object is found, the caching proxy returns that object from the cache without forwarding the query to the network device.

If a valid object is not in the cache, then the caching proxy forwards the query to an agent on the network device. The agent then returns the object from the management information base of the network device. The caching proxy can then cache the object and also returns the object to the network management system.

The caching proxy may also assign a time-to-live value to the object. The time-to-live value specifies a time that the object will be valid in the cache. In one embodiment, the caching proxy may analyze the object to classify the object in one of multiple categories. The different categories may specify different time-to-live values. The time-to-live value for the determined category is then assigned to the object.

Figure 1:
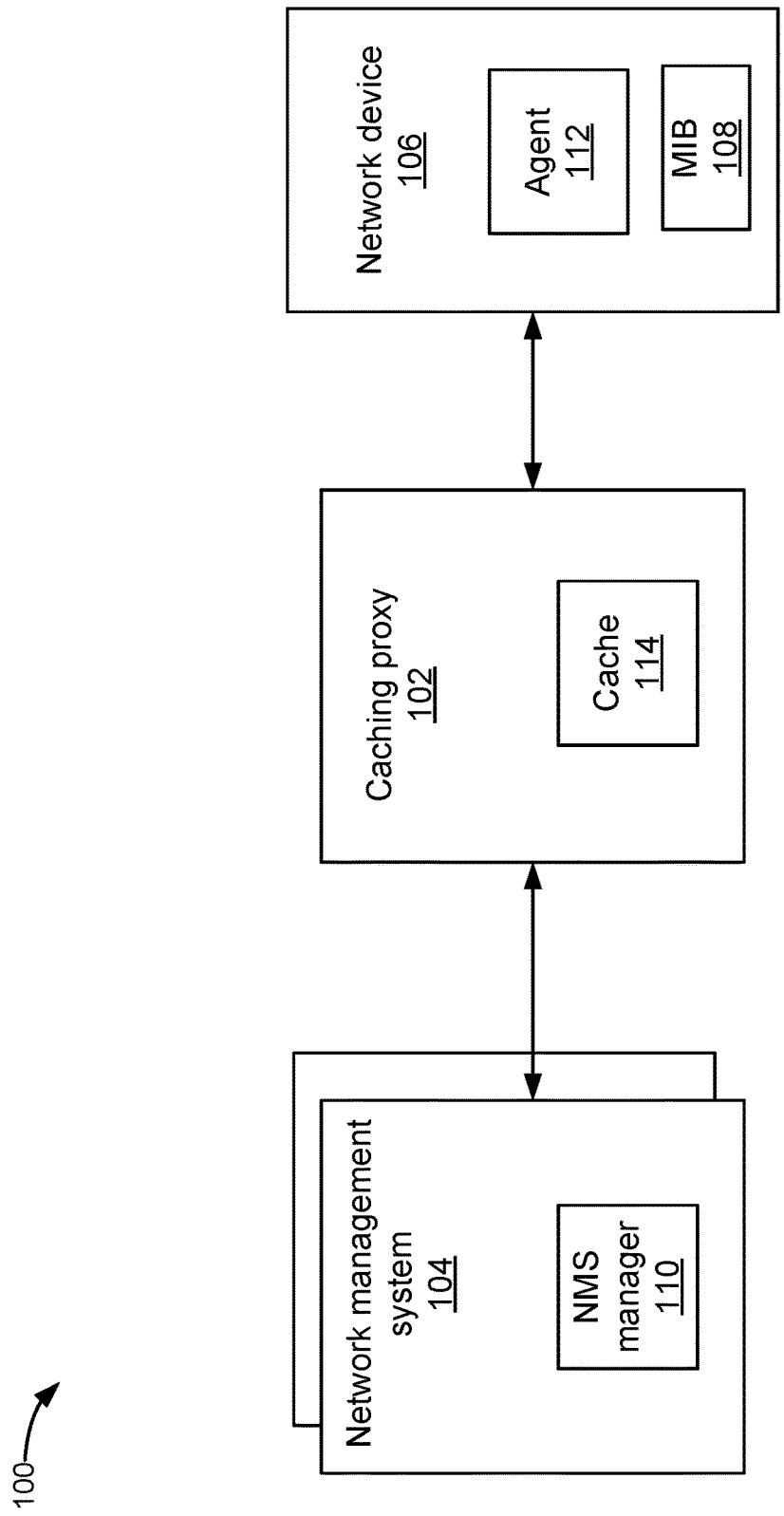
FIG. 1 depicts a simplified system using a caching proxy according to one embodiment.

FIG. 1 depicts a simplified system 100 using a caching proxy 102 according to one embodiment. System 100 includes multiple network management systems 104, caching proxy 102, and a network device 106.

Network device 106 may be part of a communication network. Each network device 106 may include a management information base (MIB) 108. MIB 108 may include multiple objects that may specify any number of specific characteristics of a network device 106. MIB 108 may be organized in an MIB hierarchy, which may be a tree where levels are assigned to different objects. Also, the objects may be identified by object identifiers (OIDs) in the MIB and the objects are linked together in the hierarchy.

In one example, a NMS manager 110 may query network device 106 to determine the MIB for the network. For discussion purposes, a single network device 106 will be discussed, but it will be understood that NMS manager 110 may query multiple network devices, but, in one embodiment, a single caching proxy 102 may be used to query a single network device 106. Additionally, a single network management system 104 may be discussed; however, there may be multiple instances of network management system 104 and/or multiple instances of NMS manager 110.

NMS manager 110 may use a protocol, such as simple network management protocol (SNMP), to query the management information base. Although SNMP is described, other protocols may be used. In one embodiment, NMS manager 110 sends queries to an agent 112 that exists on network device 106. Agent 112 can then respond to SNMP queries from NMS manager 110.

Caching proxy 102 is configured to be in between NMS manager 110 and agent 112. That is, caching proxy 102 may intercept queries from NMS manager 110 to agent 112. Caching proxy 102 can then determine if an object in a cache 114 can be used to satisfy the query. If so, caching proxy 102 may return the object in cache 114 to NMS manager 110. In this case, the query does not need to be sent to agent 112. This may free up resources on network device 106 because network device 106 does not need to respond to the query.

If a valid object is not found in cache 114, then caching proxy 102 sends the query to agent 112. Agent 112 can then determine the object from MIB 108 and return the object to caching proxy 102. Caching proxy 102 can then return the object to NMS manager 110.

In addition to returning the object, caching proxy 102 may cache the object in cache 114. Caching proxy 102 may also associate a configurable time-to-live value with the object. The time-to-live value may be a value that indicates how long the object will be valid in cache 114. Once the time-to-live value expires and the object becomes invalid, caching proxy 102 cannot use that object from cache 114 to satisfy a query.

In one embodiment, caching proxy 102 may use multiple categories that are associated with different configurable time-to-live values. Caching proxy 102 may determine a category that applies to the object based on characteristics of that object. Once the category is determined, caching proxy 102 can associate a time-to-live value for the category with the object.

The time-to-live value may ensure that NMS manager 110 receives timely data from caching proxy 102. That is, by categorizing the objects in different categories, caching proxy 102 recognizes that certain types of objects may be most likely valid for different times than other objects. This may make sure that timely data is provided from cache 114.

In one embodiment, multiple categories are used, such as a clock-type category, a stats-type category, a provisioning-type category, and a configuration-type category. Other categories may also be appreciated. At least two categories may be associated with different time-to-live values and each category may include one or more types of queries. The categories provide an efficient way to assign time-to-live values to different objects. However, it will be understood that each type of query may be assigned a different time-to-live value. That is, a first type of query is assigned a first time-to-live value, a second type of query is assigned a second time-to-live value, and so on.

The clock-type category may be objects that are associated with clocks, such as TimeTicks objects such as sysUp-Time. These are clocks that increment every clock cycle, such as every $100^{th}$ of a second, a second, etc., and have very short life times. Thus, the time-to-live value for this category may be very short or the objects may not be cached at all. This is because when another query for a clock-type object is sent, most likely, a cached clock-type object will not be valid anymore (e.g., the clock-type object would have changed values at network device 106).

A statistics-type category may include objects that are related to counts or counters, such as Counter32, Counter64, and Gauge32 objects. These objects typically have short life times and may be read-only. The statistics-type category may have a short time-to-live value such that the values for the counters may be accurate when queried. The time-to-live value for a statistics-type category may be higher than or equal to the time-to-live value for the clock-type category. This may be because the counter may increment when an event occurs, but not every clock cycle.

The provisioning-type category may be associated with provisioning activities for network device 106. This may be when resources are provisioned in network device 106. The provisioning activities may change infrequently and have longer life times that are valid in network device 106. Accordingly, the provisioning-type category may be assigned a longer time-to-live value or equal time-to-live value than the statistics-type category. In one embodiment, the time-to-live value is greater than the statistics-type time-to-live value.

A configuration-type category may be associated with writable types, such as objects that have been the subject of a SetRequest that sets the value for an object. These objects are explicitly configured by NMS manager 110 and typically are not changed very often. Accordingly, the configuration-type category may be assigned the longest time-to-live value, which is greater than or equal to the provisioning-type category. In one example, a provisioning-type object may become a configuration-type object when configured by NMS manager 110.

In one embodiment, caching proxy 102 may categorize the objects differently if caching proxy 102 detects that the objects are not identified correctly. For example, some objects may define read-only Integer32-type objects instead of Counter32- or Gauge32-type objects. In this case, the Integer32 object may be a provisioning-type object. However, caching proxy 102 may assign the statistics-type category to this object. Caching proxy 102 may not change the object type, but just assigns the time-to-live value to the object for a different category.

Caching Process

Figure 2:
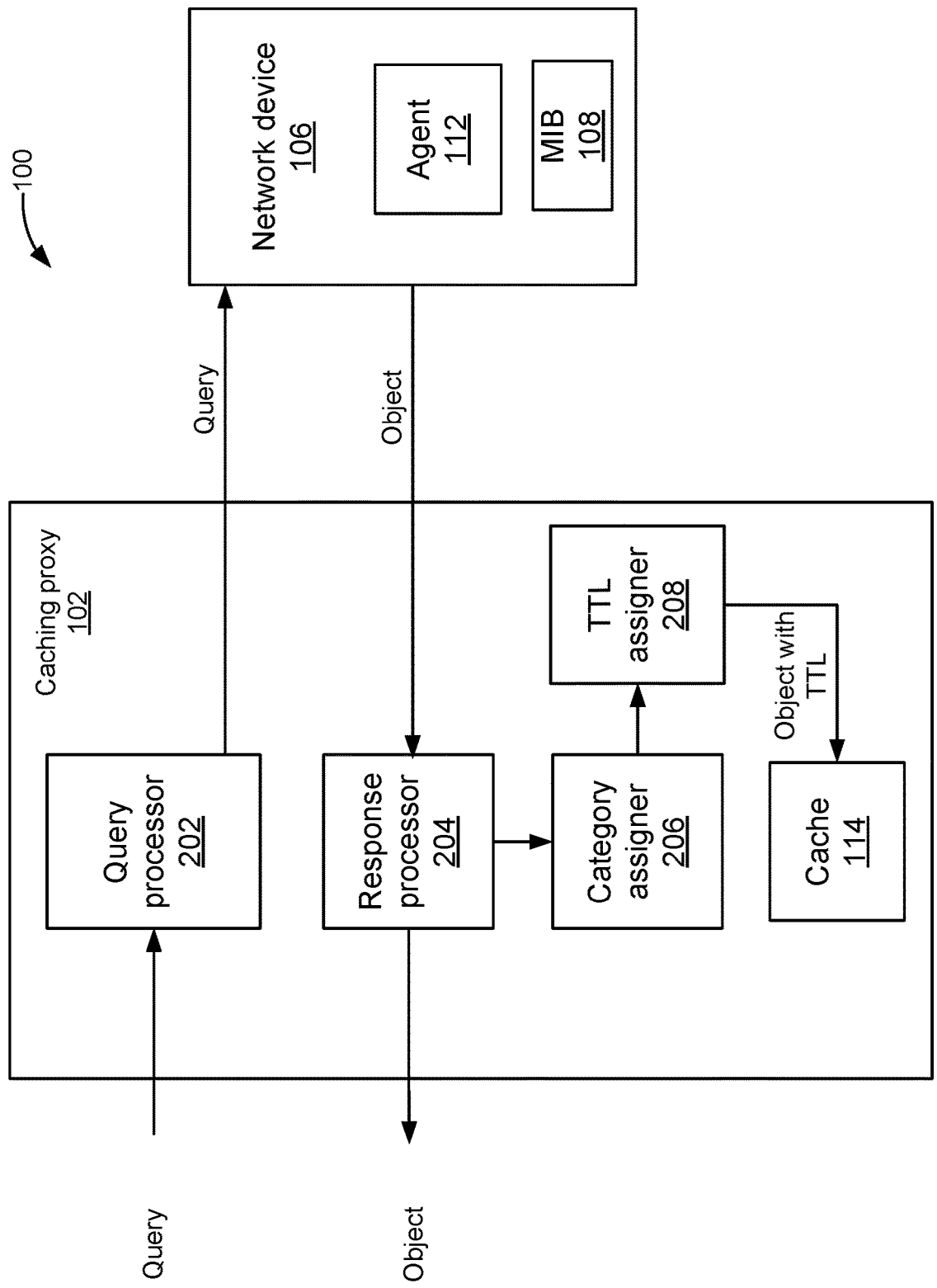
FIG. 2 depicts a more detailed example of the caching proxy according to one embodiment.

The caching process will be described in more detail. FIG. 2 depicts a more detailed example of caching proxy 102 according to one embodiment. A query processor 202 receives a query from NMS manager 110. The query may be an SNMP query for an object. In one embodiment, the queries include a get query, a get next query, a get bulk query, and a set request query. The get query may request an object associated with an OID. The get next query may request a next object associated with the OID provided in the get next query. This does not request the object associated with the OID, but rather a next object in the MIB hierarchy. A get bulk query may request a plurality of objects associated with an OID, such as the ten next objects after the OID provided in the get bulk OID. The object associated with the OID may or may not be retrieved in the get bulk query. The set request query may set a value for the object. The set request value may always need to be passed to network device 106 because that value should be configured in MIB 108. However, the get, get next, and get bulk queries may be processed using cache 114, which will be discussed later.

Query processor 202 receives the query and determines if the query should be forwarded to network device 106. In one example, if the query is a set request query, then it should be forwarded. For the other queries that may be satisfied with cache 114, query processor 202 may determine if a valid object that satisfies the query exists in cache 114. For example, query processor 202 may analyze a time-to-live value for an object that satisfies the query in cache 114. If an object exists in cache 114 and has a valid time-to-live value, then that object is returned to NMS manager 110.

This next part of the description will assume that a valid object that satisfies the query is not in cache 114. In this case, query processor 202 sends the query to agent 112 in network device 106. Agent 112 can then search MIB 108 for the requested object and return that object to a response processor 204. Response processor 204 can return this object to NMS manager 110.

In addition to returning the object, response processor 204 may store the object in cache 114. A time-to-live value also needs to be assigned to the object. In this case, a category assigner 206 reviews the query and response to determine the category. In one embodiment, the category classification does not require analysis of the specific object, that is, the information in the object. Rather, category assigner 206 can determine the category from the query/response traffic. For example, the object identifier (OID), type, and value of the returned object is carried in the SNMP response message. Category assigner 206 does not need access to the MIB definition itself to determine the types of each object returned by the agent.

Once the category is selected by category assigner 206, a TTL assigner 208 assigns the time-to-live value to the object. Then, the object is stored in cache 114. Depending on the type of query, the object may be stored in cache 114 as being linked to another object, such as the request object ID. That is, when a get next or get bulk query is used, the object that is returned may be linked to another object. For example, a first object for a first OID may be stored in cache 114. Then, the get next query for the first OID is used to retrieve a second object. The second object may be stored and linked to the first OID in view of the get next query. In the get bulk query case, consecutive objects are linked together in sequence.

Figure 3:
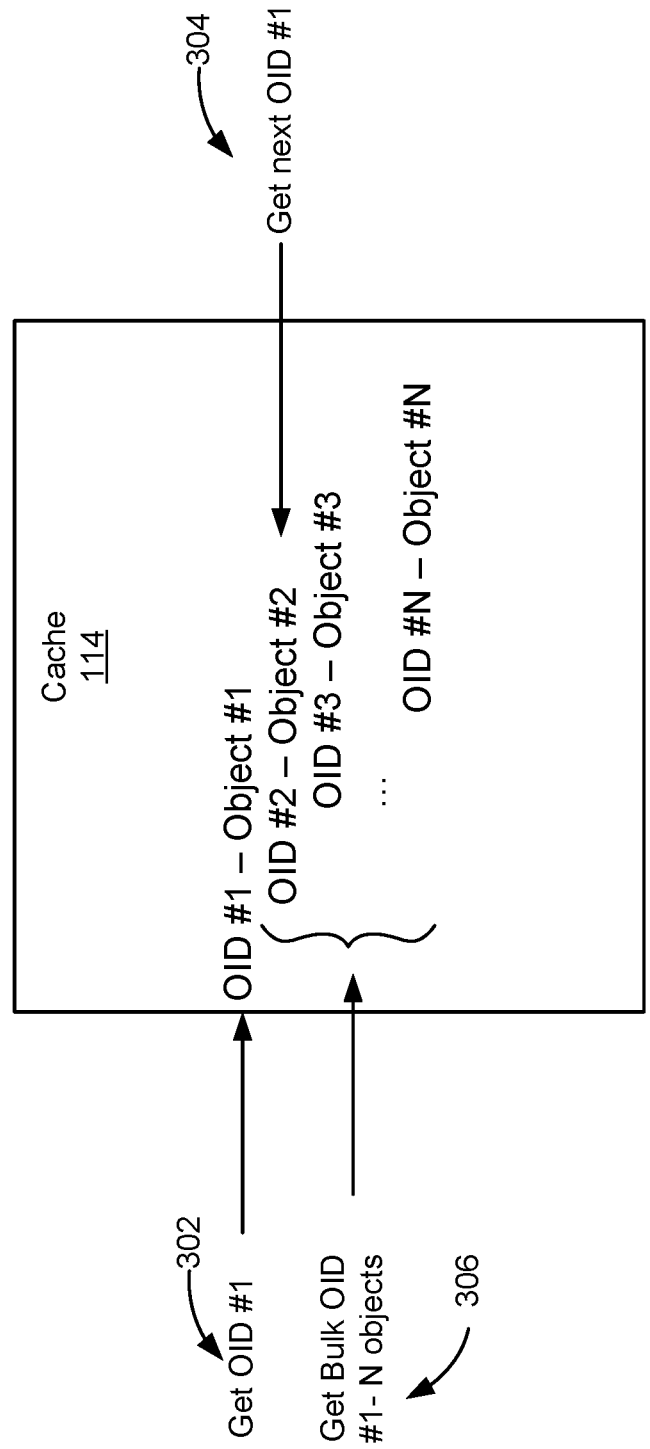
FIG. 3 shows an example of a hierarchy that shows the linking of the objects in the cache according to one embodiment.

FIG. 3 shows an example of a hierarchy that shows the linking of the objects in cache 114 according to one embodiment. At 302, an OID #1 for an object #1 may have been stored as a result of a get OID #1 query. Then, in one example, a "get next OID #1" query may be used to retrieve object #2 with an OID #2 at 304. In this case, object #2 is stored and linked to OID #1 for object #1. Additionally, a "get bulk OID #1:N objects" may be used at 306 to retrieve the N objects. That is, the N objects that are linked to OID #1 for object #1 are retrieved using the links in cache 114 to OID #1. The above queries are used to generate a hierarchical structure in cache 114. Also, depending on the categories of each object, the objects in the hierarchy may include different time-to-live values. The different time-to-live values for objects in the hierarchy may cause some problems when get next or get bulk queries are used because an object in the middle of the hierarchy may become invalid while others remain valid in cache 114. This situation will be described in more detail below.

Figure 4:
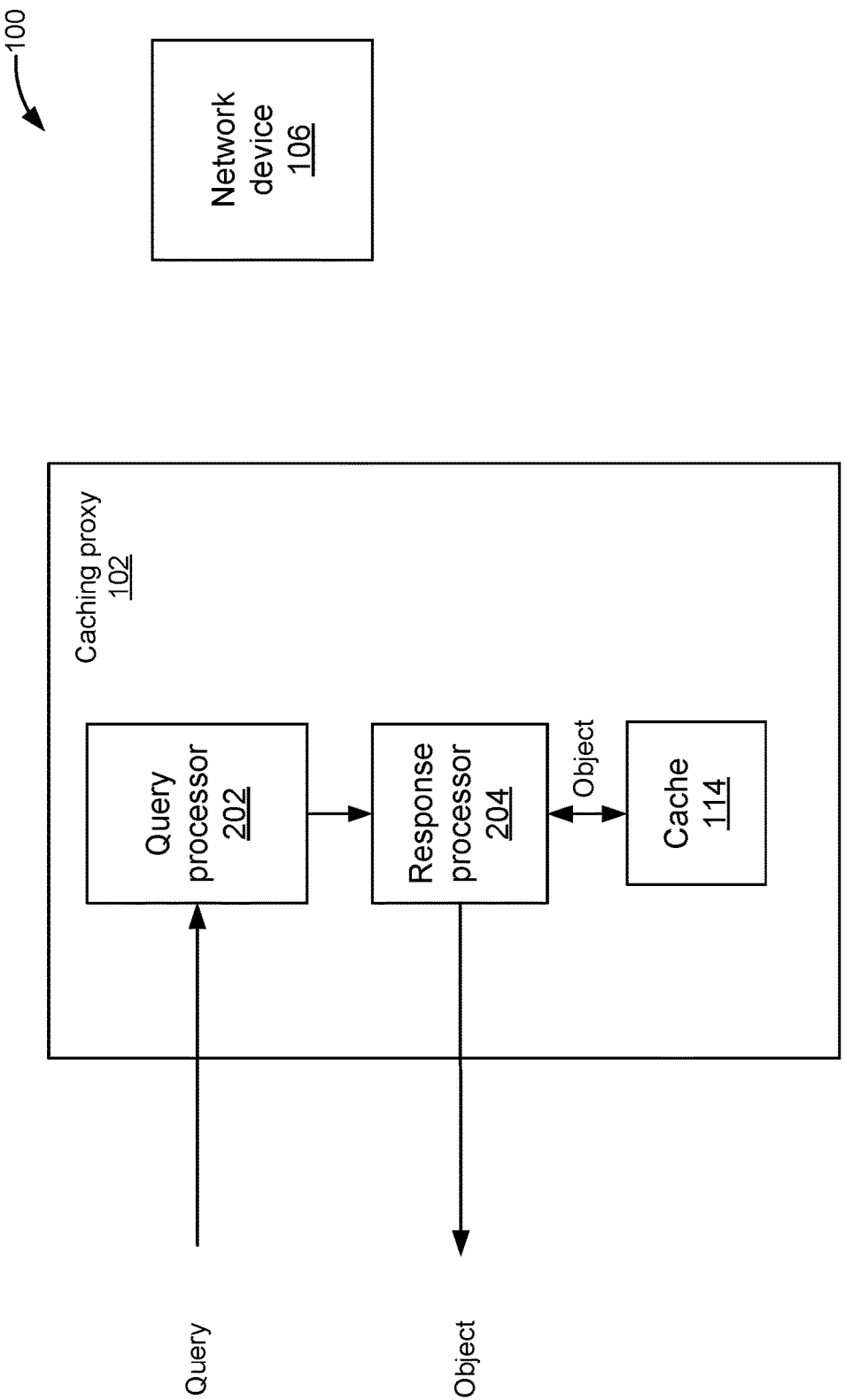
FIG. 4 depicts an example of using the cache to respond to queries according to one embodiment.

FIG. 4 depicts an example of using cache 114 to respond to queries according to one embodiment. Query processor 202 receives the query. Then, response processor 204 determines if the object is found in cache 114. If so, response processor 204 determines if the time-to-live value for the object is still valid. For example, the time-to-live value may have expired thus making this object invalid in cache 114. The object may still be in cache 114 because an algorithm to remove invalid objects from cache 114 may not have been run yet. Also, it may be desirable to keep invalidated objects in cache 114 that are linked in the hierarchy to other objects. The reasoning for this is to help respond to get next and get bulk queries, which will be described in more detail below.

When the object is valid in cache 114, query processor 202 responds to the query with the object from cache 114. In this case, query processor 202 does not communicate with agent 112 and network device 106 to have the response satisfied. When the object is not valid in cache 114, query processor 202 sends the query to network device 106 as described above.

Method Flows

Figure 5:
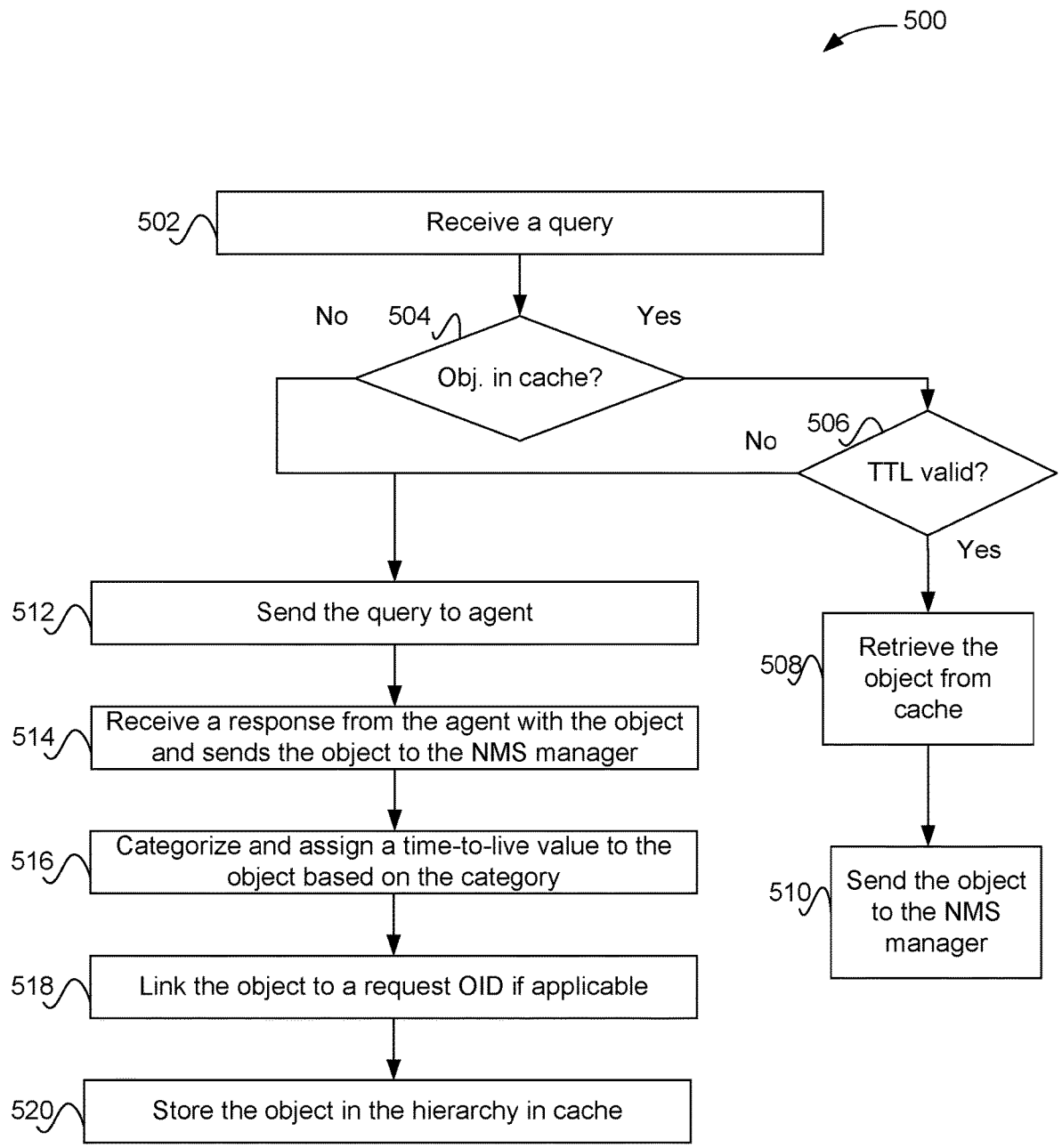
FIG. 5 depicts a simplified flowchart of a method for using the caching proxy according to one embodiment.

FIG. 5 depicts a simplified flowchart 500 of a method for using caching proxy 102 according to one embodiment. At 502, caching proxy 102 receives a query. For discussion purposes, only one object is discussed, but it will be understood that multiple objects may be requested with the query. At 504, caching proxy 102 determines if an object in cache 114 satisfies the query. If there is an object in cache 114, at 506, caching proxy 102 determines if the time-to-live (TTL) value is valid for that object. If the time-to-live value is valid, then at 508, caching proxy 102 retrieves the object from cache 114. At 510, caching proxy 102 sends the object to NMS manager 110.

If the time-to-live value was not valid, or the object was not in cache 114, at 512, caching proxy 102 sends the query to agent 112. At 514, caching proxy 102 receives a response from the agent 112 with the object and sends the object to NMS manager 110.

At 516, caching proxy 102 then categorizes and assigns a time-to-live value to the object based on the category. As discussed above, different objects may be categorized in different categories that are associated with different time-to-live values. At 518, caching proxy 102 may link the object to a request OID if applicable. This may link the object in the MIB hierarchy. Then, at 520, caching proxy 102 stores the object in the hierarchy in cache 114.

Figure 6:
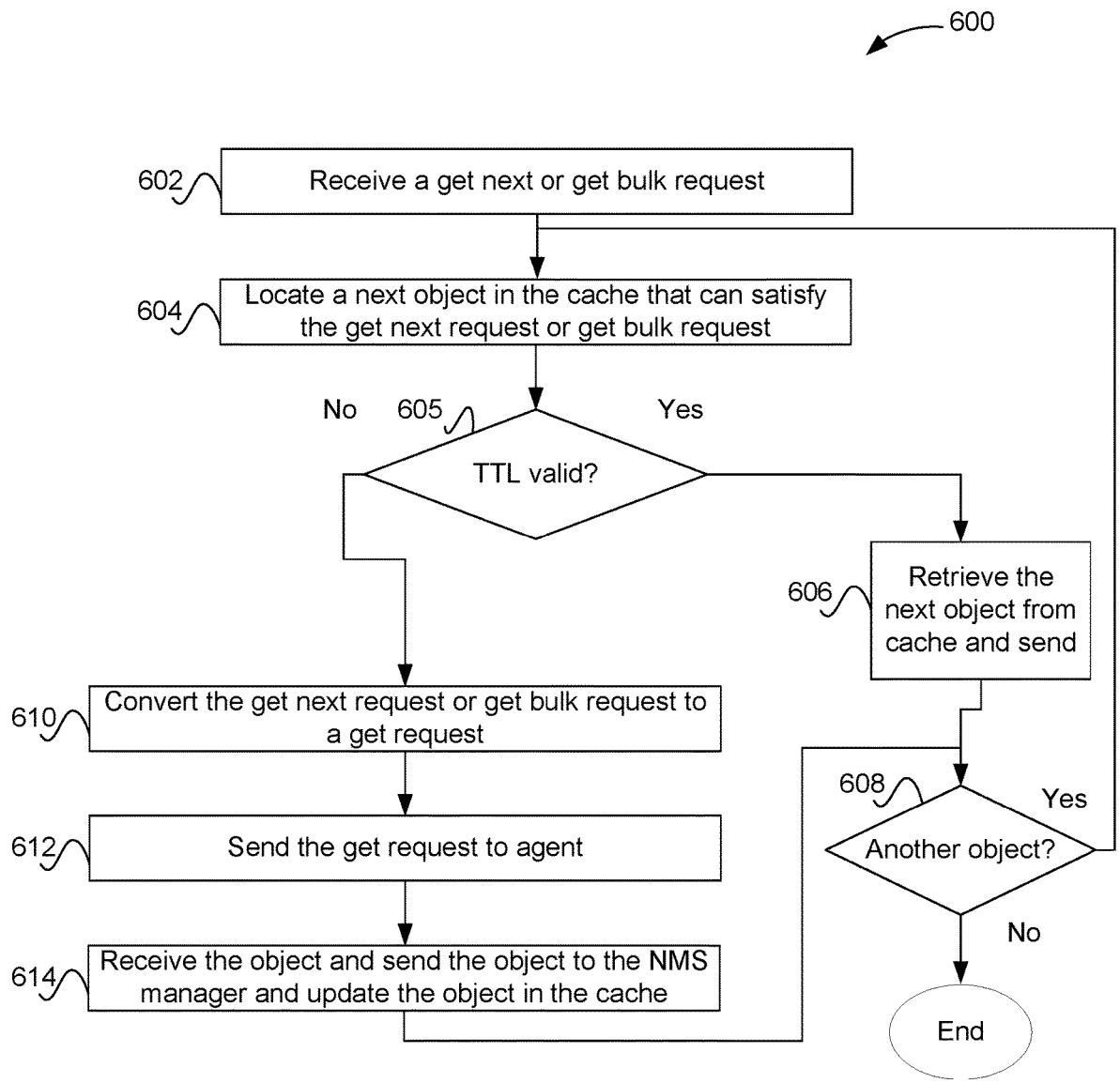
FIG. 6 depicts a simplified flowchart for processing get next and get bulk queries according to one embodiment.

As discussed above, get next and get bulk queries may be processed. FIG. 6 depicts a simplified flowchart for processing get next and get bulk queries according to one embodiment. At 602, caching proxy 102 receives a get next or get bulk query. These requests reference a first OID and request a subsequent object, such as the next OID in a get next query or a number of subsequent objects in a get bulk query.

At 604, caching proxy 102 locates a next object in cache 114 that can satisfy the get next query or get bulk query. For example, referring to FIG. 3, this may be object #2 that is linked to object #1 and OID #1.

Then, at 605, caching proxy 102 determines if the time-to-live (TTL) value of the next object is valid. If the time-to-live value is valid, at 606, caching proxy 102 retrieves the next object from cache 114 and sends the object to NMS manager 110. At 608, caching proxy 102 determines if there is another next object. If so, the process reiterates to 604. If not, the process ends.

If the time-to-live value is not valid, then caching proxy 102 cannot return this object to satisfy the request. However, caching proxy 102 may be able to request a valid object from agent 112. At 610, caching proxy 102 may convert the get next query or get bulk query to a get request to agent 112. This is different from the get next query or get bulk query because the get next query asks for the next object that is linked to OID #1 of object #1 and the get bulk query requests N objects associated with the OID #1. The get request in this case may request only object #2 (e.g., OID #2). This is important because if the original request from NMS manager 110 is a get bulk query, then converting the get bulk query to a get request may allow the get bulk query to be still satisfied from cache 114 if other subsequent objects after the invalid object are still valid. That is, once the object is received from cache 114, if subsequent objects linked to the invalid object in cache 114 are valid, then those objects can be returned by caching proxy 102. At 612, caching proxy 102 sends the get request to agent 112. At 614, caching proxy 102 receives the object and sends the object to NMS manager 110. This requests the specific object that was not valid in cache 114 from agent 112. Also, the newly retrieved object value is updated in the cache with a new time-to-live value.

The process then continues to 608 where caching proxy 102 determines if another object needs to be retrieved. The process then reiterates to 604 to determine another object, if needed. Or, the process ends.

Accordingly, caching proxy 102 is able to respond to a get next or get bulk query that encounters an object in the hierarchy that is invalid. In the case of a get bulk query, converting the get bulk query to a get request may allow subsequent objects to be retrieved from cache 114. For example, referring to FIG. 3, if object #2 is invalid, but object #3 is valid, then the get request may be sent for object #2. However, object #3 may then be retrieved from cache 114 without needing to request object #3 from agent 112.

In another embodiment, once an invalid object is encountered in a hierarchy, then the entire hierarchy may be refreshed by sending the get bulk query or get next query to agent 112 to receive all of the objects again.

Accordingly, particular embodiments provide a caching proxy that alleviates load on agent 112. Additionally, by using cache 114, multiple NMS managers 110 can leverage cache 114. This is useful when multiple NMS managers 110 may be requesting the same object in queries. Then, the load on network device 106 is significantly decreased. Further, by storing the objects in cache 114 in a hierarchy, get next and get bulk queries may be satisfied. The time-to-live value associated with the object may complicate the get next and get bulk queries. However, particular embodiments may convert the get next and get bulk queries to get requests for invalid objects that are in the middle of a hierarchy of objects.

System Implementation

Figure 7:
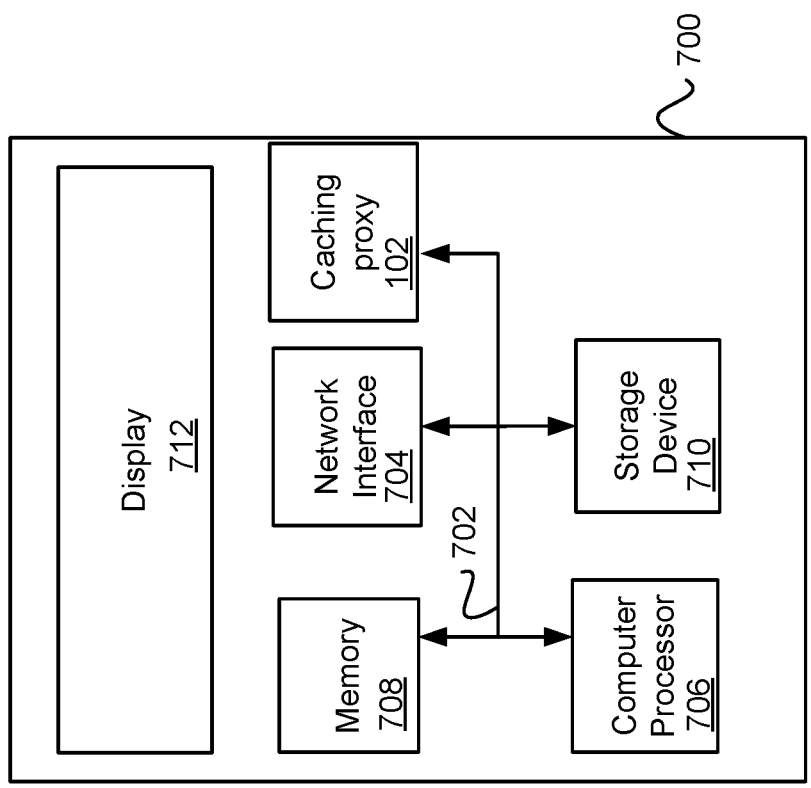
FIG. 7 illustrates an example of a special purpose computer system configured with caching proxy according to one embodiment.

FIG. 7 illustrates an example of a special purpose computer system configured with caching proxy 102 according to one embodiment. Only one instance of computer system 700 will be described for discussion purposes, but it will be recognized that computer system 700 may be implemented for other entities described above, such as network management system 104 and/or network device 106.

Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by particular embodiments. The instructions, when executed by one or more computer processors 706, may be configured to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   forwarding, by a proxy at a computing device that interfaces with multiple managers, a first request from a first manager for an object in a management information base to an agent in a network device, the object describing a characteristic of the network device;
   receiving, by the proxy at the computing device, the object from the agent;
   categorizing, by the proxy at the computing device, the object in a category of a plurality of categories based on a characteristic of Simple Network Management Protocol (SNMP) request or response message associated with the object, wherein at least two categories in the plurality of categories are associated with different time-to-live values identified in the SNMP request or response message;
   caching, by the proxy at the computing device, the object from the agent with a time-to-live value in a cache, the time-to-live value associated with the category, the time-to-live value indicating how long an object categorized in the respective category is valid in the cache;
   returning, by the proxy at the computing device, the object to the manager; and
   responding, by the proxy at the computing device, to a second request for the object using the cached object while the time-to-live value is valid without having to forward the second request to the agent.

2. The method of claim 1, further comprising:
   analyzing the time-to-live values for objects stored in the cache; and invalidating one or more objects in the cache when the time-to-live values expire for the one or more objects.

3. The method of claim 1, further comprising:
   receiving a third request for the object, wherein the time-to-live value for the object in the cache is invalid; and
   sending the request to the agent to receive the object from the agent instead of using the object that is invalidated in the cache.

4. The method of claim 1, wherein caching comprises:
   linking the cached object to a request object identifier for the first request.

5. The method of claim 4, wherein the request object identifier is for another object that is a parent object to the object in the management information base.

6. The method of claim 1, wherein the object requested by the second request is a child object of a parent object, the child object being the cached object, the method further comprising:
   determining if the time-to-live value for the cached object is valid; and
   when the time-to-live value is valid, returning the cached object in response to the second request.

7. The method of claim 6, further comprising:
   when the time-to-live value is not valid, converting the second request to a third request that requests the object from the agent;
   sending the third request to the agent;
   receiving the object from the agent; and
   returning the object in response to the second request.

8. The method of claim 1, wherein the second request requests a plurality of objects for an object identifier, the plurality of objects including the cached object, the method further comprising:
   determining if the time-to-live value for the plurality of objects is valid;
   when the time-to-live value for a first set of the plurality of objects is not valid, converting the second request to one or more third requests that request the first set of the plurality of objects;
   sending the one or more third requests to the agent;
   receiving the first set of the plurality of objects from the agent; and
   returning the first set of the plurality of objects in response to the second request.

9. The method of claim 8, further comprising:
   when the time-to-live value for a second set of the plurality of objects is valid, returning the second set of the plurality of objects along with the first set of the plurality of objects in response to the second request, the second set of the plurality of objects being located in the cache.

10. The method of claim 1, wherein the second request requests a plurality of objects for an object identifier, the plurality of objects including the cached object, the method further comprising:
    determining if the time-to-live value for any of the plurality of objects is invalid; and
    when the time-to-live value for any of the plurality of objects is invalid, sending the second request to the agent to retrieve the plurality of objects from the agent.

11. The method of claim 10, wherein even when one or more of the plurality of objects have time-to-live values that are valid, the plurality of objects from the agent are used to respond to the request.

12. The method of claim 11, wherein the plurality of objects are stored in the cache with new time-to-live values.

13. The method of claim 1, wherein the plurality of categories comprise a clock category for clock type objects, a counter category for counter type objects, a provisioning category for provisioned objects, and a configuration category for objects that were configured by the manager.

14. The method of claim 13, wherein the counter category has a time-to-live value that is greater than or equal to the clock category, the provisioning category has a time-to-live value that is greater than or equal to the counter category, the configuration category has a time-to-live value that is greater than or equal to the provisioning category.

15. The method of claim 14, wherein the plurality of objects are stored in the cache with new time-to-live values.

16. A non-transitory computer-readable storage medium containing instructions that, when executed, control a computer system to be configured for:
- forwarding, by a proxy that interfaces with multiple managers, a first request from a manager for an object in a management information base to an agent in a network device, the object describing a characteristic of the network device;
- receiving, by the proxy, the object from the agent;
- categorizing, by the proxy at the computing device, the object in a category of a plurality of categories based on a characteristic of Simple Network Management Protocol (SNMP) request or response message associated with the object, wherein at least two categories in the plurality of categories are associated with different time-to-live values identified in the SNMP request or response message;
- caching, by the proxy, the object from the agent with a time-to-live value in a cache, the time-to-live value associated with the category;
- returning, by the proxy, the object to the manager; and
- responding, by the proxy, to a second request for the object using the cached object while the time-to-live value is valid without having to forward the second request to the agent.

17. The non-transitory computer-readable storage medium of claim 16,
- wherein the second request requests a plurality of objects for an object identifier, the plurality of objects including the cached object, the method further comprising:
- determining if the time-to-live value for the plurality of objects is valid;
- when the time-to-live value for a first set of the plurality of objects is not valid, converting the second request to one or more third requests that request the first set of the plurality of objects;
- sending the one or more third requests to the agent;
- receiving the first set of the plurality of objects from the agent;
- returning the first set of the plurality of objects in response to the second request; and
- when the time-to-live value for a second set of the plurality of objects is valid, returning the second set of the plurality of objects along with the first set of the plurality of objects in response to the second request, the second set of the plurality of objects being located in the cache.

18. A method comprising:
- receiving, by a proxy at a computing device that interfaces with multiple managers, a first request from a manager for an object in a management information base at a network device, the object describing a characteristic of the network device;
- determining, by the proxy at the computing device, if a cache includes the object;
- when the cache includes the object, determining, by the proxy at the computing device, if a time-to-live value is valid for the object;
- when the time-to-live value is valid, by the proxy at the computing device, sending the object from the cache to the manager without sending the request to an agent at the network device;
- when the time-to-live value is not valid, determining, by the proxy at the computing device, if the first request should be converted into a second request,
- wherein the first request is converted when the first request is a request for retrieving a next object in a hierarchy or a plurality of objects in the hierarchy; and
- when the first request should be converted into a second request, converting,
- by the proxy at the computing device, the first request to the second request for the object and sending the second request to the agent.

19. The method of claim 18, wherein when the first request is for retrieving the next object and specifies a parent object to the object in the hierarchy, the method further comprising:
- converting the first request into the second request where the second request requests the object instead of the next object for the parent object.

20. The method of claim 18, wherein when the first request is for retrieving the plurality of objects and specifies a parent object to the plurality of objects, the method further comprising:
- converting the first request into the second request where the second request requests the object instead of the plurality of objects.

* * * * *